(12) United States Patent
Sennhauser

(10) Patent No.: US 12,379,013 B2
(45) Date of Patent: Aug. 5, 2025

(54) ENERGY-ABSORPTION DEVICE, SUPPORT, CABLE BRAKE, SAFETY NET CONSTRUCTION AND METHOD

(71) Applicant: Geobrugg AG, Romanshorn (CH)

(72) Inventor: Marcel Sennhauser, Wittenbach (CH)

(73) Assignee: Geobrugg AG, Romanshorn (CH)

( * ) Notice: Subject to any disclaimer, the term of this patent is extended or adjusted under 35 U.S.C. 154(b) by 546 days.

(21) Appl. No.: 17/792,549

(22) PCT Filed: Jan. 22, 2021

(86) PCT No.: PCT/EP2021/051517
§ 371 (c)(1),
(2) Date: Jul. 13, 2022

(87) PCT Pub. No.: WO2021/151802
PCT Pub. Date: Aug. 5, 2021

(65) Prior Publication Data
US 2023/0043490 A1    Feb. 9, 2023

(30) Foreign Application Priority Data

Jan. 28, 2020    (DE) .................... 10 2020 101 985.8

(51) Int. Cl.
*E01F 7/04*     (2006.01)
*E01F 15/06*    (2006.01)
(Continued)

(52) U.S. Cl.
CPC ............ *F16G 11/046* (2013.01); *E01F 7/045* (2013.01); *E01F 15/06* (2013.01); *F16G 11/12* (2013.01)

(58) Field of Classification Search
CPC .......... F16F 7/12; F16G 11/046; F16G 11/12; E01F 7/045; E01F 15/06
(Continued)

(56) References Cited

U.S. PATENT DOCUMENTS 3,454,293 A * 7/1969 Howlett .................. F16G 11/12
403/44
4,730,810 A * 3/1988 Rambaud .............. F16G 11/046
256/25
(Continued)

FOREIGN PATENT DOCUMENTS

CN        1594743 A    3/2005
DE        1285493 B    12/1968
(Continued)

OTHER PUBLICATIONS

Office Action dated Jul. 25, 2024 issued for the corresponding Korean Patent Application No. 10-2022-7029261 (and English translation).
(Continued)

*Primary Examiner* — Thomas W Irvin
(74) *Attorney, Agent, or Firm* — Posz Law Group, PLC

(57) ABSTRACT

An energy absorption device for absorbing at least a portion of impact energy occurring in an impact of an impact body in a safety net construction includes at least one cable guiding unit forming at least one cable receiving region for receiving and/or guiding at least one cable, and further includes at least one energy absorption element, arranged in the cable receiving region and forming at least one friction surface for the guided cable, the energy absorption element being configured, if a force inducing movement of the cable across the friction surface is exerted on the cable, to selectively absorb at least a portion of energy the force created via substantial deformation and/or abrasion of the friction surface. A cable brake, particularly a block-and-tackle cable brake, includes an energy absorption element of the energy absorption device, which is arranged at the deflection element on a side facing toward the cable.

19 Claims, 4 Drawing Sheets

Figure 1:
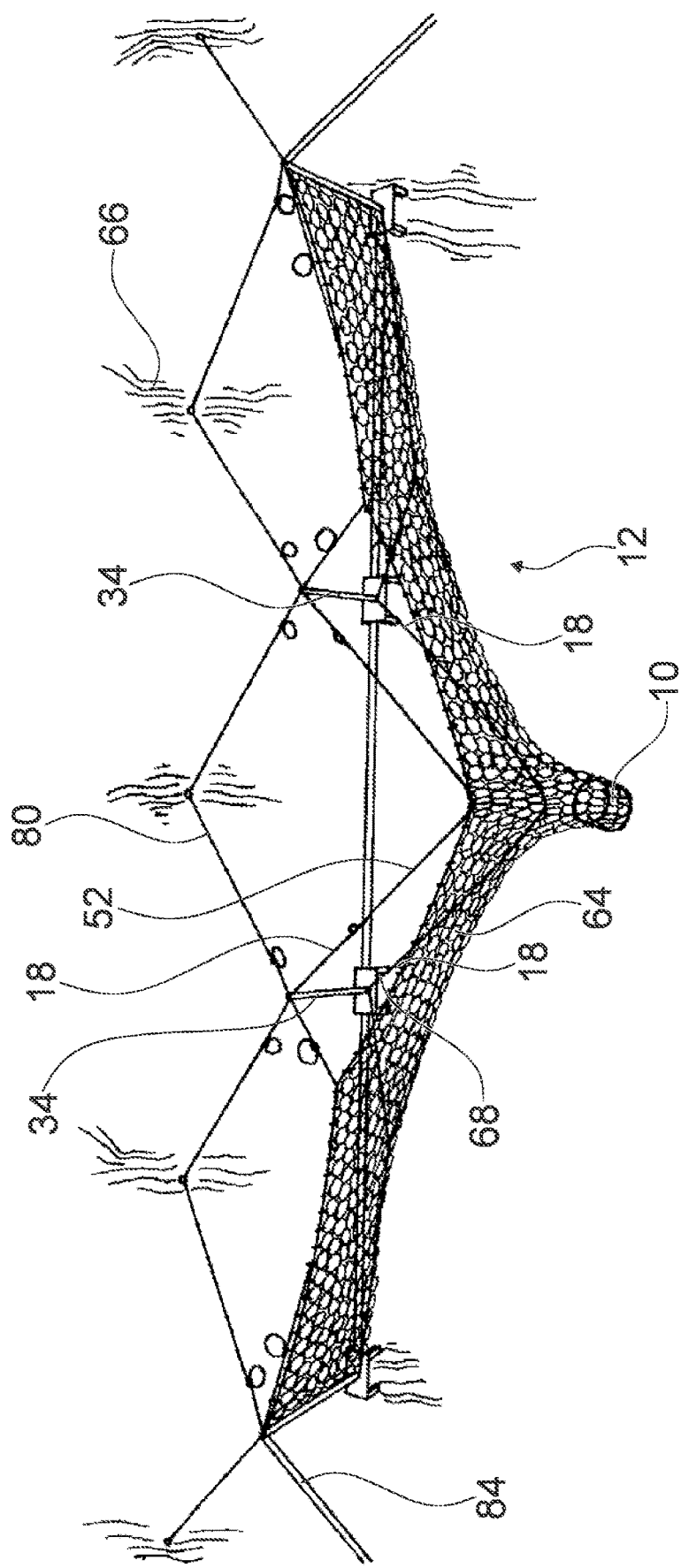

(51) Int. Cl.
*F16F 7/12* (2006.01)
*F16G 11/04* (2006.01)
*F16G 11/12* (2006.01)

(58) Field of Classification Search
USPC .......................................................... 188/371
See application file for complete search history.

(56) References Cited

U.S. PATENT DOCUMENTS

| | | | | |
|---|---|---|---|---|
| 4,819,915 | A * | 4/1989 | Cargnel | E01F 7/045 256/12.5 |
| 5,395,105 | A * | 3/1995 | Thommen, Jr. | E01F 7/045 256/12.5 |
| 5,524,875 | A * | 6/1996 | Thommen, Jr. | E01F 7/045 256/12.5 |
| 6,131,873 | A * | 10/2000 | Blazon | E01F 7/045 248/548 |
| 6,338,399 | B1 * | 1/2002 | Choate | A62B 35/0056 188/374 |
| 6,592,103 | B2 * | 7/2003 | Sennhauser | E01F 7/045 256/45 |
| 7,188,825 | B2 * | 3/2007 | Sennhauser | E01F 7/045 256/45 |
| 8,079,571 | B2 * | 12/2011 | Nishita | E01F 7/045 256/45 |
| 2002/0056834 | A1 * | 5/2002 | Sennhauser | E01F 7/045 256/12.5 |
| 2005/0050830 | A1 * | 3/2005 | Sennhauser | E01F 7/045 52/633 |
| 2010/0327244 | A1 * | 12/2010 | Nishita | E01F 7/045 256/24 |
| 2011/0297907 | A1 * | 12/2011 | Nishita | E01F 7/045 256/12.5 |
| 2014/0374203 | A1 | 12/2014 | Stelzer et al. | |
| 2016/0252151 | A1 * | 9/2016 | Chan | F16F 7/128 188/371 |
| 2018/0347126 | A1 | 12/2018 | Boutillier et al. | |

FOREIGN PATENT DOCUMENTS

| | | | |
|---|---|---|---|
| EP | 0531574 | A1 | 3/1993 |
| EP | 1205603 | A3 | 9/2004 |
| EP | 1911884 | A1 | 4/2008 |
| JP | 11315512 | A | 11/1999 |
| JP | 2001-348818 | A | 12/2001 |
| JP | 2005282244 | A | 10/2005 |
| JP | 2007-113201 | A | 5/2007 |
| JP | 2008150867 | A | 7/2008 |
| JP | 2012-225073 | A | 11/2012 |
| JP | 2012211500 | A | 11/2012 |
| KR | 101914693 | B1 | 11/2018 |
| WO | 2015/128177 | A1 | 9/2015 |
| WO | 2016/181281 | A1 | 11/2016 |

OTHER PUBLICATIONS

Office Action dated Nov. 4, 2024 issued for the corresponding Brazilian Patent Application No. BR112022014248-0 (and English translation).
Indian Office Action issued Nov. 29, 2022 in connection with corresponding Indian Patent Application No. 202217039718 (and English translation).
Australian Office Action mailed Aug. 2, 2023 in corresponding Australian Patent Application No. 2021215092.
Chilean Office Action mailed Oct. 2, 2023 in corresponding Chilean Patent Application No. 202202010 (and English machine translation).
German Search Report dated Sep. 24, 2020, issued in corresponding German Patent Application No. DE 10 2020 101 985.8 (and partial English translation).
English machine translation of International Preliminary Report on Patentability dated Jul. 28, 2022, issued in corresponding International Patent Application No. PCT/EP2021/051517.
Office Action mailed Jun. 27, 2023 issued for the corresponding CN Patent Application No. 202180011063.5 (and English translation).
Office Action mailed Aug. 1, 2023 issued for the corresponding JP Patent Application No. 2022-545890 (and English translation).
Chinese Office Action issued Nov. 6, 2023 in corresponding Chinese Patent Application No. 202180011063.5 (and English machine translation).
Canadian Office Action issued Oct. 25, 2023 in corresponding Canadian Patent Application No. 3,165,542.

* cited by examiner

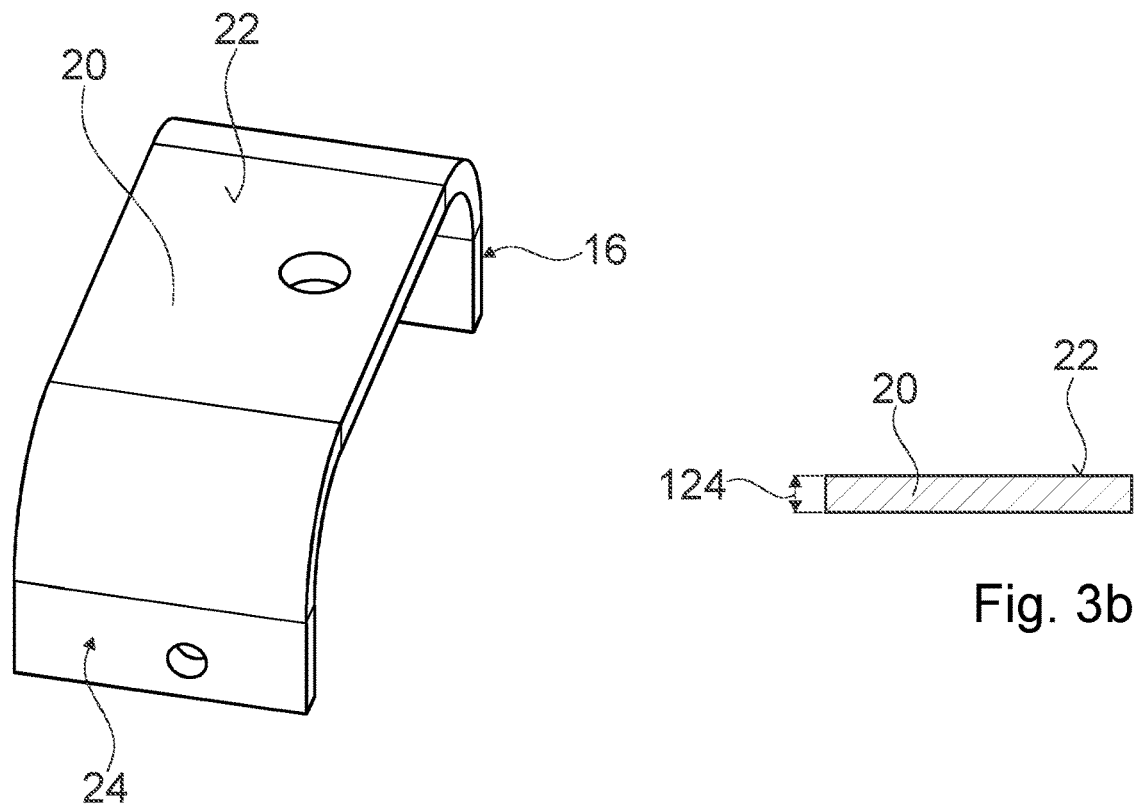
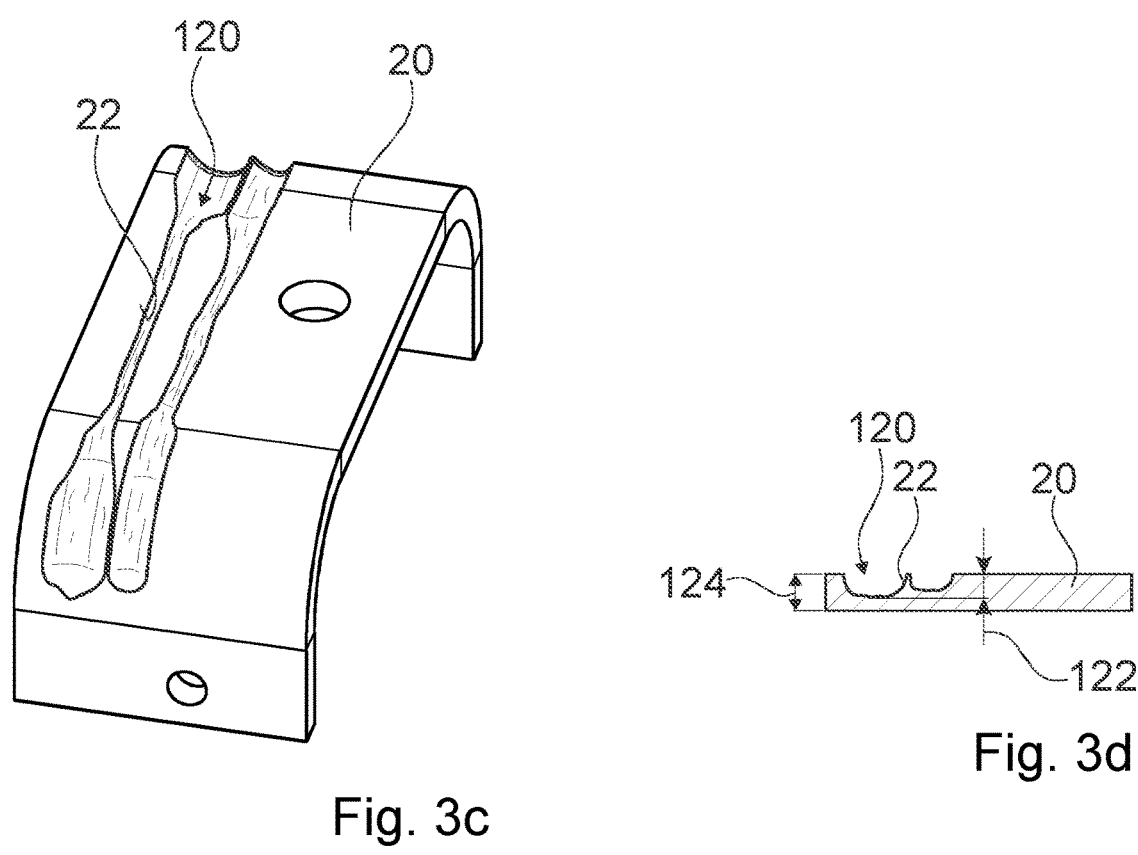

ENERGY-ABSORPTION DEVICE, SUPPORT, CABLE BRAKE, SAFETY NET CONSTRUCTION AND METHOD

CROSS REFERENCE TO RELATED APPLICATIONS

This application is a U.S. national stage application of PCT/EP2021/051517 filed on Jan. 22, 2021, which is based on German patent application DE 10 2020 101 985.8 filed on Jan. 28, 2020, the contents of which are incorporated herein by reference.

PRIOR ART

The invention concerns an energy absorption device, a post, a cable brake, a safety net construction and a method.

Energy absorption devices, for an absorption at least of a portion of an impact energy occurring in an impact of an impact body into a safety net construction, have already been proposed.

The objective of the invention is in particular to provide a generic device having advantageous energy absorption characteristics, in particular impact energy absorption characteristics. The objective is achieved according to the invention by the features of the independent patent claims while advantageous implementations and further developments of the invention may be gathered from the subclaims.

Advantages of the Invention

An energy absorption device for an absorption and/or conversion at least of a portion of an impact energy occurring in an impact of an impact body in a safety net construction is proposed, with at least one cable guiding unit which forms at least one cable receiving region for receiving and/or guiding at least one cable, in particular at least one steel cable of the safety net construction, and with at least one energy absorption element, which is arranged in the cable receiving region and which forms at least one friction surface for the at least one guided cable, the energy absorption element being configured, if a force is exerted on the cable, which is generated for example by the impact of the impact body in the safety net construction, said force inducing a movement of the cable across the friction surface, to selectively absorb at least an, in particular substantial, portion, of an energy, in particular cable energy, created by the force via a substantial deformation of the friction surface, in particular of a volume body of the energy absorption element that is situated below the friction surface, and/or via a substantial abrasion, in particular substantial milling, substantial material relocation, substantial deformation and/or substantial transformation of the friction surface. Preferably the energy absorption element is configured to absorb at least 1%, preferentially at least 2% of the impact energy by a substantial deformation of the friction surface, in particular of a volume body situated below the friction surface, and/or by substantial abrasion, in particular substantial milling, substantial material relocation, substantial deformation and/ or substantial transformation of the friction surface, in particular of the energy absorption element, preferably of a volume body of the energy absorption element that is situated below the friction surface, at least as long as the impact energy is below a maximum impact energy provided for the safety net construction. This allows achieving advantageous energy absorption characteristics, in particular an advantageously high proportionate absorption of the impact energy by the energy absorption device. Advantageously, an energy absorption device for safety net constructions can be obtained that is implemented and/or installable in a particularly simple manner. Furthermore, favorable energy absorption is advantageously achievable, which at the same time ensures a reduced risk of cable-damaging. This advantageously allows achieving a high level of safety and/or reducing a risk of system breakdown. Advantageously the impact energy can be converted at least partially into a deformation energy and/or milling energy acting on the energy absorption element, in particular on the friction surface. Moreover, after a load case, the energy absorption element is advantageously exchangeable in a simple and cost-efficient manner. "Configured" is in particular to mean specifically designed and/or equipped. By an object being configured for a certain function is in particular to be understood that the object fulfills and/or executes said certain function in at least one application state and/or operation state.

An "energy absorption device" is in particular to mean a part of a safety net construction system which is configured to absorb, in the load case, a portion, in particular a substantial portion, of an impact energy and/or to convert said portion into one or several other forms of energy. A "safety net construction" is in particular to mean a barrier with at least one protective net, in particular at least one catch net, for example a rockfall protection barrier, an avalanche protection barrier, a landslide barrier, a debris flow barrier, or furthermore a motorsport protection fence, a ram protection fence, for example for terrorism defense, or a protection against explosions and/or projectiles. The cable guiding unit delimits the cable receiving region, in particular to at least one side, preferably to at least two sides, preferentially to at least three sides and particularly preferentially to four sides. The cable is in particular realized as a steel cable or steel cable, comprising preferably at least one steel wire made of a high-tensile steel and is preferably completely made of a high-tensile steel. The cable is in particular embodied as a carrying cable of the safety net construction, for example as a lower or mountain-side carrying cable and/or as an upper or valley-side carrying cable. Preferably the cable is realized as a cable by which at the same time a safety net, for example a ring net or a tetragonal mesh net, is fastened and/or suspended.

The energy absorption element is in particular arranged in the cable receiving region in such a way that, in a rest state and/or in a moved state, at least one side of the cable lies upon a surface of the energy absorption element, in particular a friction surface of the energy absorption element. Preferably the energy absorption element extends over a large portion of a longitudinal extension, preferentially over the entire longitudinal extension, of the cable receiving region. In particular, the longitudinal extension of the cable receiving region runs at least substantially parallel to a longitudinal extension of the cable within the cable receiving region. In particular, during a movement of the cable across the energy absorption element, the surface of the energy absorption element, preferably the friction surface of the energy absorption element, is configured for a friction with the cable, preferably so as to substantially impede the movement of the cable. In particular, the friction surface is planar. Alternatively the friction surface may be realized in an undulating fashion. This advantageously permits increasing a friction factor. In particular, the friction surface is implemented so as to be at least substantially smooth.

Alternatively, the friction surface may be rough or structured. This advantageously permits increasing a friction factor.

A "substantial deformation" and/or a "substantial abrasion" is in particular to mean a deformation, an abrasion and/or a re-formation going beyond a slight deformation or abrasion that only results in scratches. In particular, a substantial deformation and/or a substantial abrasion goes beyond a deformation and/or abrasion concerning only a surface and/or a surface area of the energy absorption element. In particular, a substantial deformation and/or a substantial abrasion is to mean a deformation of a material above a flow limit of the material, which is preferably a plastic and/or irreversible deformation and/or abrasion. Preferably a substantial deformation and/or a substantial abrasion goes beyond a simple deformation and/or abrasion of the surface and also comprises a considerable deformation and/or abrasion of the volume body of the energy absorption element that is arranged below the friction surface. Preferably the substantial deformation and/or the substantial abrasion creates at least a notch in the energy absorption element which—preferably measured from an original position of the friction surface, in at least one point of the energy absorption element, in particular after an impact of an impact body with a maximum impact energy provided for the safety net construction—has a depth of at least a tenth of a diameter of the cable, preferably at least an eighth of the diameter of the cable, preferentially at least a fifth of the diameter of the cable, and particularly preferentially at least a third of the diameter of the cable. In particular, after the substantial deformation, in particular after an impact of an impact body with a maximum impact energy provided for the safety net construction, the depth of the notch is in at least one point of the energy absorption element at least 2 mm, preferably at least 3 mm, preferentially at least 5 mm and particularly preferentially at least 7 mm. In particular, after the substantial deformation and/or abrasion, in particular after an impact of an impact body with a maximum impact energy provided for the safety net construction, the depth of the notch is in at least one point of the energy absorption element at least 20%, preferably at least 30%, preferentially at least 50% and particularly preferentially at least 70% of an, in particular average, material thickness of the energy absorption element. A "substantial milling" is in particular to mean an abrasion of a substantial portion of the energy absorption element in at least one point of the energy absorption element, for example an abrasion of a material layer of at least 2 mm, preferably at least 3 mm, preferentially at least 5 mm and particularly preferentially at least 7 mm, or of at least 20%, preferably at least 30%, preferentially at least 50% and particularly preferentially at least 70% of a material thickness of the energy absorption element in the at least one point of the energy absorption element. In particular, in the substantial deformation and/or abrasion a portion of the material of the energy absorption element is relocated, in particular by abrading or scraping. Preferably the relocated portion amounts to at least 1%, preferably at least 2%, preferentially at least 3% and particularly preferentially at least 5% of the entire material of the energy absorption element, in particular measured relative to a total volume of the energy absorption element. A "selective deformation" and/or a "selective abrasion" is in particular to mean a deformation and/or abrasion of the friction surface, and in particular of the energy absorption element, which is intended and/or desired on the background of an energy conversion and energy transfer from the cable to the energy absorption element. Preferably the materials of the cable and of the energy absorption element, in particular in a region of the friction surface, are selected in such a way that the cable generates the substantial deformation and/or the substantial abrasion of the energy absorption element, preferably without itself undergoing substantial damages, abrasions and/or deformations, e. g. of a cable cross section.

In particular, the energy absorption element can be mounted exchangeably at the safety net construction, in particular to a post of the safety net construction. In particular, the energy absorption element can be demounted from the safety net construction, in particular from the post of the safety net construction, in a non-destructive manner. In particular, the energy absorption element comprises at least one mounting element enabling a releasable mounting of the energy absorption element at a safety net construction, in particular to the post of the safety net construction.

Furthermore, it is proposed that the energy absorption element is realized, at least in a region of the friction surface, preferably completely, of a material having a Mohs hardness that is smaller than 4, preferably smaller than 3.5. In this way advantageous energy absorption characteristics are attainable. It is advantageously possible to concentrate a deformation and/or abrasion to the energy absorption element, the cable remaining at least substantially free of deformation, in particular if it is made of steel, preferably of high-tensile steel. In particular, the energy absorption element is realized, at least in a region of the friction surface, preferably completely, of a material having a Mohs hardness that is smaller than the Mohs hardness of steel. In particular, the energy absorption element may be made of a synthetic material, for example rubber, carbon, aramid (Kevlar™, Twaron™, etc.) or of corresponding fiber materials, of a ceramic, in particular a ceramic fiber material, of a glass or glass fiber material, of a mineral material (asbestos, etc.) or of a different natural product. However, preferentially the energy absorption element is made at least largely, preferably completely, of a metal, particularly preferentially of a metal different from steel. It is in particular conceivable that the energy absorption element is made of a material that is also used as a friction agent of a brake lining in automotive engineering, like for example semi-metallic or ceramic friction agents having a metal fraction (aluminum, steel, iron, copper, brass, etc.) and a graphite, ceramic (fiber) and/or filling material fraction.

If the energy absorption element is realized, at least in a region of the friction surface, preferably completely, of a material which is under friction with steel, in particular with the steel cable, free of sparking, in particular of frictional and/or impact sparking, a particularly high degree of safety is advantageously achievable. It is advantageously possible to prevent fires caused by flying sparks. Safety net constructions are often installed in rough terrains in open nature, where fires may spread quickly and are difficult to extinguish. In particular if the energy absorption element is made of a material different than steel, in the case of friction with a steel cable sparking can be prevented as so-called steel sparks, for example frictional steel sparks or impact steel sparks, are generated by steel-on-steel friction or in an impact of steel on steel.

It is moreover proposed that the energy absorption device comprises the cable which is guided in the cable guiding unit, the energy absorption element being made of a material that substantially differs from the cable. In this way advantageous energy absorption characteristics are attainable. It is advantageously possible to concentrate a deformation and/or abrasion to the energy absorption element, the cable remaining at least substantially free of deformation. In particular, the cable which is guided in the cable receiving region is made of a material that is substantially harder than aluminum. By a "material that is substantially harder" is in particular a material to be understood which has a Mohs hardness that is greater by at least 0.5, preferably by at least 1 and preferentially by at least 1.5.

If furthermore the energy absorption element is realized, at least in a region of the friction surface, preferably completely, of aluminum or of an aluminum alloy, advantageous energy absorption characteristics are attainable, in particular if the cable is embodied as a steel cable. It is advantageously possible to effectively prevent a generation of sparks in a load case. Advantageously a risk of damaging the cable can be kept low. Advantageously material and/or production costs can be kept low. Alternatively, further metals or metal alloys are conceivable, which in particular have a smaller hardness than steel, for example copper or copper alloys.

Beyond this it is proposed that at least the energy absorption element has in at least one peripheral region a surface, in particular friction surface, which is curved away from the cable receiving region. In this way it is advantageously possible to ensure a cable contact deforming the energy absorption element during an entire movement process of the cable in a load case. Advantageously effective energy absorption can be ensured. Preferably, in at least two peripheral regions, which are in particular situated opposite each other, preferentially opposite each other in the longitudinal direction of the cable receiving region, the energy absorption element has surfaces which are curved away from the cable receiving region. In particular, the energy absorption element is curved in the two peripheral regions in the same direction, preferably in an at least substantially identical fashion. In particular, the surface of the energy absorption element is in the peripheral region curved out of a plane of the friction surface by at least 30°, preferably by at least 45°, preferentially by at least 60° and particularly preferentially by at least 90°. In particular, the energy absorption element is realized as a punch-bent component made of sheet aluminum. In particular, the energy absorption element has an at least substantially constant material thickness. Alternatively, the energy absorption element may also be realized as a volume body, for example as a milled component, and/or may have varying material thicknesses. In particular, the energy absorption element, preferably at least the surface of the energy absorption element, is realized so as to be at least substantially U-shaped. Alternatively or additionally, the surface of the energy absorption element may, for example, be realized in an undulating fashion, in particular in a region of the friction surface.

It is further proposed that the energy absorption device comprises at least one second energy absorption element, which is embodied separately from the energy absorption element. In this way particularly advantageous energy absorption characteristics are attainable. It is in particular possible to achieve especially advantageous energy-absorbing cable guidance of the cable in the cable receiving region in a load case. In particular, the second energy absorption element is arranged in the cable receiving region. In particular, the second energy absorption element delimits the cable receiving region at least to one side, which is preferably different from the side to which the cable receiving region is delimited by the energy absorption element. In particular, the second energy absorption element comprises a friction surface. In particular, the cable is adjacent to the friction surface of the second energy absorption element in the rest state and/or in the load case. In particular, the second energy absorption element is realized substantially differently than the energy absorption element. In particular, the second energy absorption element is at least substantially identical to the energy absorption element in regard to its functionality. In particular, the second energy absorption element is configured, when a force is exerted on the cable inducing a movement of the cable across the friction surface, to selectively absorb at least a portion of an energy generated by the force by a substantial deformation and/or a substantial abrasion of the friction surface. In particular, the second energy absorption element has a different, preferably smaller, curvature of the surface in the peripheral region than the energy absorption element.

In addition, it is proposed that the second energy absorption element comprises a friction surface which is oriented at least substantially perpendicularly to the friction surface of the energy absorption element. This allows achieving an especially advantageous cable guidance of the cable, which is damped by the energy absorption device. In particular, the second energy absorption element is arranged at the post of the safety net construction in such a way that the friction surface of the second energy absorption element is oriented perpendicularly to the friction surface of the energy absorption element.

It is furthermore proposed that the energy absorption device comprises at least a plurality of energy absorption elements, a plurality of second energy absorption elements and/or a plurality of further energy absorption elements, which upon an impact of an impact body with a maximum impact energy provided for the safety net construction, in combination absorb, at least 10%, preferably at least 15% and preferentially at least 20% of the—in particular maximum—impact energy. In this way especially advantageous energy absorption of the impact energy is enabled. In particular, upon an impact of an impact body with the maximum impact energy provided for the safety net construction, all energy absorption elements of a safety net construction in combination absorb at least 10%, preferably at least 15% and preferentially at least 20% of the—in particular maximum—impact energy.

It is moreover proposed that at least one of the energy absorption elements, all energy absorption elements and/or the energy absorption device are/is implemented free of movable components, in particular of freely movable and/or rotatable components. This advantageously allows reducing complexity. Advantageously, an energy absorption device is achievable that can be installed, exchanged and manufactured in a particularly simple manner. In particular, the energy absorption element and/or the energy absorption device are/is free of rollers and/or cardan joints.

Beyond this a post for a safety net construction is proposed, with at least one post element, which is in particular embodied as a post pillar, and with at least one energy absorption device comprising at least one energy absorption element, preferably the energy absorption element and/or the second energy absorption element. In this way advantageous energy absorption characteristics, in particular an advantageously high proportionate absorption of the impact energy by the energy absorption device are/is attainable. Advantageously it is possible to obtain an energy absorption device for safety net constructions which is implemented and/or installable in a particularly simple manner. Advantageously, moreover favorable energy absorption is achievable, which at the same time ensures a reduced risk of cable-damaging. This advantageously allows achieving a high level of safety and/or reducing a risk of system breakdown. In particular, the safety net construction comprises a plurality of at least substantially identical posts. In particular, the post element is configured to be anchored with an end, in particular a lower end, relative to a ground and/or rock. In particular, the post element has at its lower end mounting elements for a fixation of the post element on a ground, on a rock or on a concrete base or something like that. Alternatively it is conceivable that the post comprises an anchoring element that is realized separately from the post element, in particular a post base realized separately from the post element, which is connected to the post element, i. e. the post pillar, during mounting. In particular, the post element is made of a steel.

Furthermore it is proposed that the energy absorption element and/or the second energy absorption element are/is arranged at an upper end of the post element and/or at a post head of the post element. This allows achieving advantageous energy absorption characteristics, in particular an advantageously high proportionate absorption of the impact energy by the energy absorption device. In particular, an especially advantageous damped guiding of a cable, in particular of the upper carrying cable, of the safety net construction is achievable. By an "upper end" is in particular an end to be understood which in a mounted state of the post points away from the ground or from the rock and/or is the farthest away from the ground or from the rock. By a "post head" is in particular an upper closure surface of the post and/or of the post element to be understood. In particular, a surface, preferably the friction surface of the energy absorption element in a state when mounted at the post, is curved away in a direction that runs at least substantially perpendicularly to the ground and/or to the rock, preferably in a valley-side direction. In particular, the surface, preferably the friction surface of the second energy absorption element is, in a state when mounted at the post, curved away toward the ground and/or the rock.

It is also proposed that the at least one energy absorption element or a further energy absorption element of the energy absorption device, which is at least substantially identical to the energy absorption element, at least in its functionality, is arranged at a lower end of the post element and/or at a post base of the post and/or of the post element. This allows achieving advantageous energy absorption characteristics, in particular by an advantageously high proportionate absorption of the impact energy by the energy absorption device. In particular, especially advantageous damped guiding of a cable, in particular of the lower carrying cable, of the safety net construction is achievable. By a "lower end" is in particular an end to be understood which in a mounted state of the post points toward the ground or to the rock and/or is closest to the ground or to the rock. By a "post base" is in particular a portion of the post and/or of the post element to be understood which lies upon the ground, on a rock or on the concrete base. In particular, the post base comprises mounting elements via which the post is anchored in the ground, in the concrete base and/or in the rock. In particular, a surface, preferably the friction surface of the further energy absorption element, is in a state when mounted at the post curved away in a direction that is at least substantially perpendicular to the ground and/or to the rock, in particular in a valley-side direction.

In particular, the further energy absorption element delimits a further cable receiving region, which is arranged at the post base, at least to one side. In particular, the further energy absorption element comprises a friction surface. In particular, the cable is adjacent to the friction surface of the further energy absorption element in the rest state and/or in a load case. In particular, the further energy absorption element is, at least in its outer shape, realized at least substantially identically to the energy absorption element, which is in particular arranged at the post head. In particular, the further energy absorption element is configured, when a force is exerted onto a lower carrying cable, inducing a movement of the lower carrying cable across the friction surface, to selectively absorb at least a portion of an energy created by the force via a substantial deformation and/or abrasion of the friction surface. In particular, the further energy absorption element, preferably at least the surface of the further energy absorption element, is formed at least substantially in a U-shape. Alternatively or additionally, the surface of the further energy absorption element may, for example, also be realized in an undulating fashion, in particular in a region of the friction surface. In particular, the friction surface of the further energy absorption element is arranged at least substantially parallel to the friction surface of the energy absorption element. In particular, the friction surface of the further energy absorption element is oriented at least substantially perpendicularly to the friction surface of the second energy absorption element. In particular, the friction surface of the further energy absorption element is realized at least substantially perpendicularly to a support surface, in particular a base plate, of the post base, which in the mounted state in particular lies upon the ground, on the rock and/or on a concrete base. The term "substantially perpendicularly" is here in particular intended to define an orientation of a direction relative to a reference direction wherein the direction and the reference direction, in particular viewed in a projection plane, include an angle of 90°, the angle having a maximum deviation that is in particular smaller than 8°, advantageously smaller than 5° and particularly advantageously smaller than 2°. "Substantially parallel" is here in particular to mean an orientation of a direction relative to a reference direction, in particular in a plane, wherein the direction has a deviation from the reference direction that is in particular smaller than 8°, advantageously smaller than 5° and particularly advantageously smaller than 2°.

If the energy absorption element delimits the cable receiving region at least on a valley side, particularly effective transmission of the impact energy from the cable to the energy absorption element is achievable. In this way particularly advantageous energy absorption characteristics are attainable. In particular, the energy absorption element delimits the cable receiving region at least to a side which extends parallel to a main extension direction of the post element. In particular, the energy absorption element delimits the cable receiving region at least to a side which extends at least substantially parallel to a main extension direction of a safety net of the safety net construction that is held by the post. By a "main extension plane" of a structural unit is in particular a plane to be understood which is parallel to a largest side surface of a smallest imaginary rectangular cuboid just still completely enclosing the structural unit, and which in particular extends through the center point of the rectangular cuboid. By a "main extension direction" of an object is here in particular a direction to be understood which runs parallel to a longest edge of the smallest geometric rectangular cuboid just still completely enclosing the object. In particular, the cable receiving region is on a mountain side not delimited by an energy absorption element.

It is further proposed that the cable receiving region is configured for receiving at least one carrying cable, in particular carrying steel cable, of the safety net construction. In this way advantageously an advantageous, in particular as direct as possible, energy transmission of the impact energy onto the energy absorption element is enabled.

In addition, it is proposed that the energy absorption element is exchangeably mountable and/or demountable, in particular to and/or from the post element. This advantageously enables simple reconditioning and/or repair of the safety net construction after an impact event. Advantageously, in this way costs are considerably reducible. In particular, the energy absorption element is exchangeable without requiring demounting or exchange of the post and/or of the post element. Advantageously exchanging the energy absorption element is particularly simple.

Beyond this it is proposed that the post comprises a fastening element, which is configured for a releasable fastening of the energy absorption element at the post element and/or for a support of the energy absorption element relative to the post element. This advantageously allows simple reconditioning and/or repair of the safety net construction after an impact event. Advantageously, exchanging the energy absorption element is particularly simple. Advantageously, in this way costs are considerably reducible. In particular, the fastening element is realized as a lie-upon surface which is configured for the energy absorption element to lie on. In particular, the fastening element forms a support surface for the exchangeably mountable energy absorption element. In particular, the post element comprises two or more fastening elements, which are formed at least substantially identically. This advantageously allows building in of the post element in different orientations with respect to the ground and/or to the rock.

If the fastening element is realized integrally with the post element, this advantageously enables especially stable and/or simple construction. "Realized integrally" is in particular to mean connected by substance-to-substance bond, like for example by a welding process and/or gluing process etc., and especially advantageously molded-on. Advantageously, integrally is also to mean as one part. "As one part" is in particular to mean formed in one piece. Preferably said one piece is made of a single blank, of one mass and/or of one cast.

If moreover the fastening element is made of a material having a substantially higher Mohs hardness than the energy absorption element, advantageously an especially stable and robust construction is attainable. In particular, the fastening element is made of a material having a Mohs hardness of at least 4.5. In particular, the fastening element is made of a steel.

Furthermore it is proposed that the post comprises at least the second energy absorption element, which is realized separately from the energy absorption element, the second energy absorption element having a recess in which the energy absorption element is inserted at least partially in a mounted state. This allows ensuring an especially advantageous implementation of the cable receiving region, which in particular enables especially effective energy transmission from the cable to the energy absorption device. In particular, the insertion of the two energy absorption elements into each other permits a delimitation of the cable receiving region— as gap-free as possible—to at least two sides, in particular to those two sides of the cable receiving region which are swept over by the cable in the load case. In particular, the energy absorption element engages at least partially into the second energy absorption element.

Moreover, a cable brake, in particular a block-and-tackle cable brake, for a safety net construction is proposed, with at least one cable, with at least one deflection element and with at least the energy absorption device comprising at least one energy absorption element, wherein the energy absorption element is arranged at the deflection element on a side of the deflection element facing toward the cable. In this way further improved energy absorption characteristics, in particular an advantageously further augmented proportionate absorption of the impact energy by the energy absorption device, are/is attainable. It is in particular conceivable that a safety net construction comprises the cable brake with the energy absorption element and/or the post with the energy absorption element. In particular, a shape of the energy absorption element of the cable brake is adapted to an outer shape of the deflection element. In particular, the cable is guided in the cable brake, in particular the block-and-tackle cable brake, analogously to a once-deflected or multi-deflected block-and-tackle, the deflection element with the energy absorption element in particular substituting at least one block of the block-and-tackle. In particular, the cable is configured, when sweeping over the energy absorption elements, to substantially deform and/or substantially abrade the energy absorption elements while transferring energy to the energy absorption elements. In particular, one side of the cable brake, in particular the block-and-tackle cable brake, is firmly fixed, for example in the ground or in the rock, while an opposite side of the cable brake, in particular the block-and-tackle cable brake, is connected or at least operatively connected to a cable of the safety net construction, for example a carrying cable, a retaining cable, a catch cable or a further cable of the safety net construction. In particular, the energy absorption element of the cable brake is—except for its outer shape—at least substantially identical to the afore-described energy absorption element of the post, in particular in regard to an energy absorption effect, to materials and/or material characteristics.

Furthermore, a safety net construction is proposed, with an energy absorption device or several energy absorption devices, with a post or several posts and/or with a cable brake or several cable brakes. In this way advantageous energy absorption characteristics, in particular an advantageously high proportionate absorption of the impact energy by the energy absorption device, are/is attainable.

Beyond this a method is proposed for an at least partial absorption of an impact energy, induced by an impact of an impact body in a safety net construction, by means of the energy absorption device, in which in at least one method step at least a portion of the impact energy is absorbed by at least one cable of the safety net construction as an energy absorption element of the energy absorption device is selectively deformed, in particular re-formed, abraded and/or milled. In this way advantageous energy absorption characteristics, in particular an advantageously high proportionate absorption of the impact energy by the energy absorption device, are/is attainable.

The energy absorption device according to the invention, the post according to the invention, the cable brake according to the invention, the safety net construction according to the invention and the method according to the invention shall herein not be limited to the application and implementation described above. In particular, in order to fulfill a functionality that is described here, the energy absorption device according to the invention, the post according to the invention, the cable brake according to the invention, the safety net construction according to the invention and the method according to the invention may comprise a number of individual elements, components, method steps and units that differs from a number given here.

DRAWINGS

Further advantages will become apparent from the following description of the drawings. In the drawings two exemplary embodiments of the invention (cable guiding unit and cable brake) are illustrated. The drawings, the description and the claims contain a plurality of features in combination. Someone skilled in the art will purposefully also consider the features separately and will find further expedient combinations.

Figure 2:
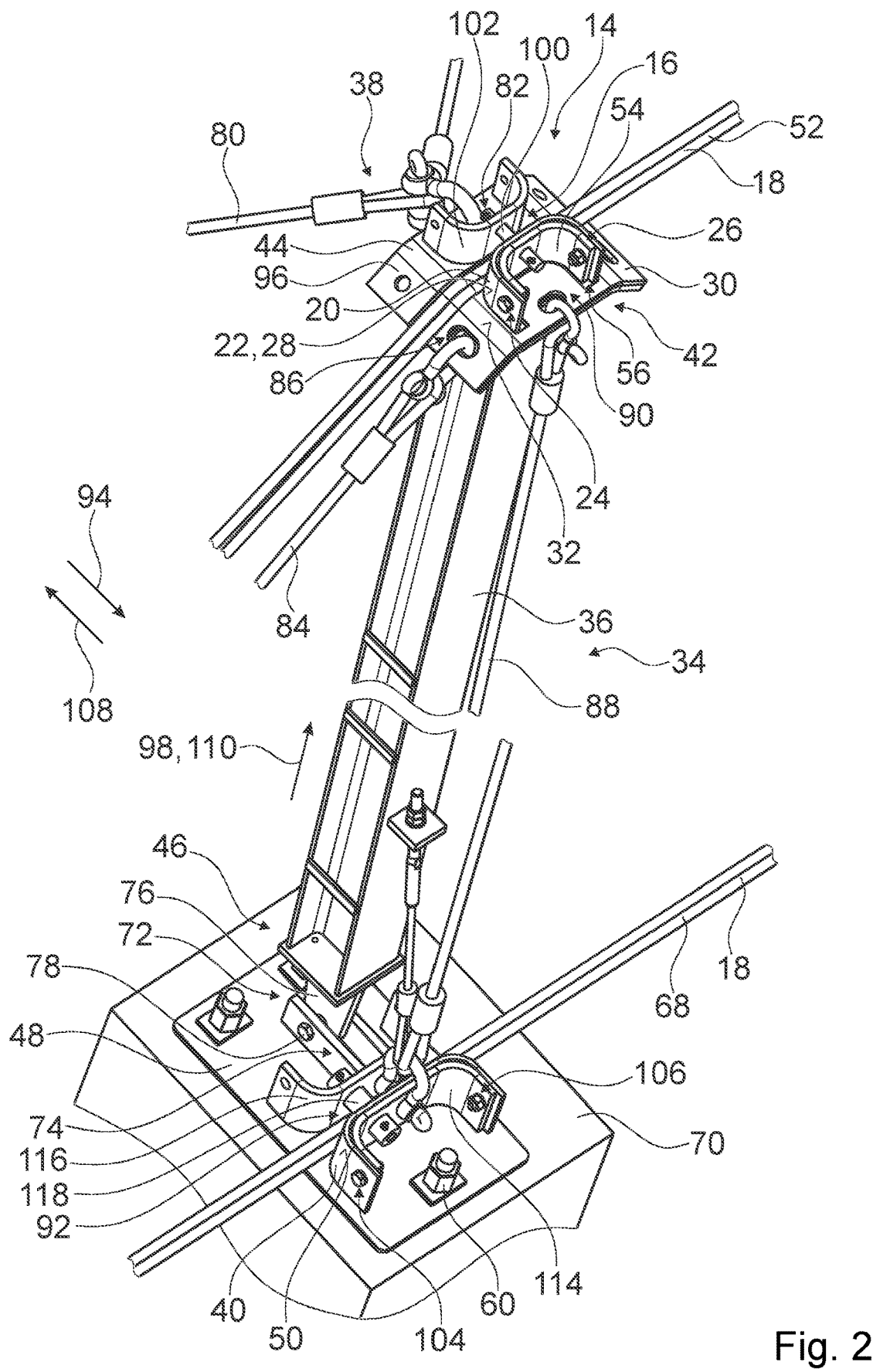
Figure 4:
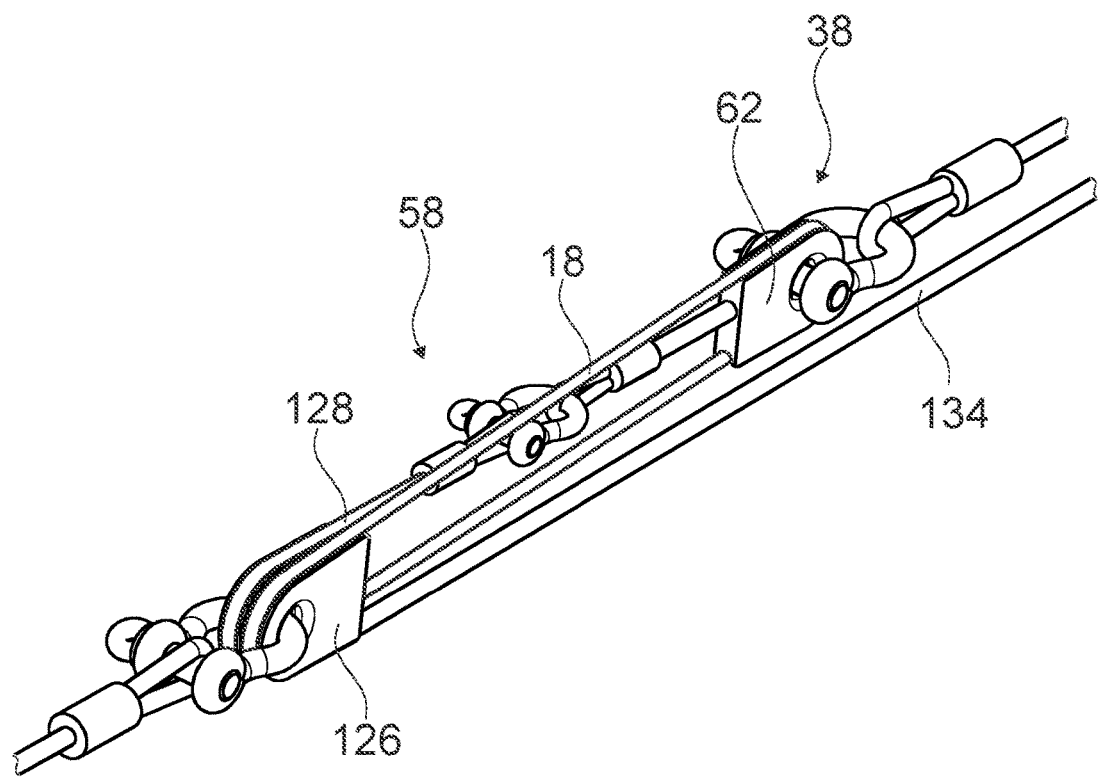
Figure 5:
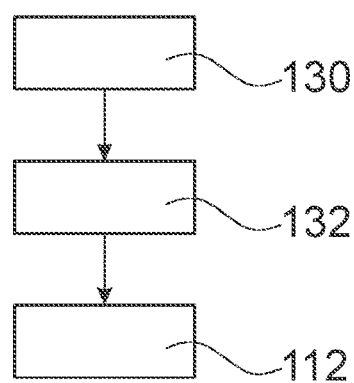

It is shown in:

FIG. 1 a schematic perspective view of a safety net construction,

FIG. 2 a schematic perspective view of a post of the safety net construction with an energy absorption device, FIG. 3a a schematic perspective view of an energy absorption element of the energy absorption device in a non-deformed state, FIG. 3b a schematic cross-sectional view of the energy absorption element in a non-deformed state, FIG. 3c a schematic perspective view of the energy absorption element of the energy absorption device in a deformed state, FIG. 3d a schematic cross-sectional view of the energy absorption element in the deformed state, FIG. 4 a schematic view of a cable brake with the energy absorption device, and FIG. 5 a flow chart of a method for an absorption of an impact energy by means of the energy absorption device.

DESCRIPTION OF THE EXEMPLARY EMBODIMENTS

FIG. 1 shows a perspective view of a safety net construction 12. The safety net construction 12 is in the illustrated case embodied as a rockfall protection barrier which is configured to catch impact bodies 10, for example pieces of rock. Alternative kinds of safety net constructions 12 are conceivable. The safety net construction 12 comprises a safety net 64. The safety net 64 is in the illustrated case realized as a ring net. Alternative customary kinds of safety nets 64 are conceivable. FIG. 1 shows the safety net construction 12 directly after an impact of an impact body 10. The impact body 10 was caught by the rockfall protection barrier and is suspended in the safety net 64. In the catching process, the kinetic energy of the impact body 10 was completely absorbed by the safety net construction 12. In the illustrated case the safety net construction 12 comprises four posts 34. The posts 34 are anchored in a rock face 66. The safety net construction 12 comprises cables 18. The cables 18 are at least partially anchored at the rock face 66. The cables 18 are fastened at the posts 34. The cables 18 are partially threaded into the safety net 64. The safety net 64 is fastened, in particular suspended, at the rock face 66 and at the posts 34 via the cables 18. The safety net construction 12 comprises upper carrying cables 52. The upper carrying cables 52 extend in each case between upper ends 42 of neighboring posts 34. The upper carrying cables 52 are fastened at the upper ends 42 of the posts 34. The safety net construction 12 comprises lower carrying cables 68. The lower carrying cables 68 extend in each case between lower ends 46 of neighboring posts 34. The lower carrying cables 68 are fastened at the lower ends 46 of the posts 34. The carrying cables 52, 68 are implemented as steel cables and are in particular made of high-tensile steel wire.

FIG. 2 shows a perspective detail view of a post 34 of the safety net construction 12. The post 34 comprises a post element 36. The post element 36 is embodied as a post pillar. The post element 36 is implemented of steel. The post element 36 comprises an, in particular double-T-shaped, steel girder. The post 34 comprises a post base 48. The post base 48 is implemented so as to be separable, preferably separate, from the post element 36. The post base 48 is fastened at a lower end 46 of the post element 36. The post base 48 forms at least a portion of an anchoring element of the post 34. The post base 48 is configured to establish a contact of the post 34 with a ground or with a rock, in particular with a rock face 66. The post base 48 is configured to lie upon the ground or the rock, in particular the rock face 66, with an underside. Alternatively or additionally, the post base 48 lies upon a specially built foundation 70, in particular a concrete foundation, like in the case illustrated in FIG. 2. The post base 48 is firmly anchored in the ground, in the rock, in the rock face 66, in the foundation 70, or the like via an earth and/or rock anchor 60. In the case shown, the foundation 70 is realized as a concrete base. A surface of the concrete base which the post base 48 lies upon may be at least substantially parallel to a surface of the rock, of the rock face 66 or of the ground. In particular if the rock, the rock face 66 or the ground has a steep incline, the surface of the concrete base which the post base 48 lies upon may include an angle with the surface of the rock, the rock face 66 or the ground. Preferably the surface of the concrete base then has a smaller incline than the rock, the rock face 66 or the ground (see also FIG. 1), in particular an incline that is smaller by at least 10°, preferably smaller by at least 15° or preferentially smaller by at least 20°.

The post base 48 comprises a connection unit 72, which is configured for a mounting of the post element 36 at the post base 48. The connection unit 72 comprises connection rails 74. The connection rails 74 comprise opposite-situated mounting holes for a mounting of the post element 36 via a screw 78 or a bolt. The post element 36 comprises a connection element 76. The connection element 76 is configured to be inserted between the connection rails 74 of the connection unit 72 of the post base 48. The connection element 76 has a mounting hole for a mounting at the post base 48 via a screw 78 or a bolt. The connection rails 74 extend at least substantially perpendicularly to a longitudinal extension of the carrying cables 52, 68, in particular of the lower carrying cable 68. The connection unit 72 is configured to permit in a load case a partial pivoting of the post element 36, in particular in a valley direction.

The post 34, in particular the post element 36, comprises a post head 44. The post head 44 is arranged at an upper end 42 of the post element 36. The post head 44 is embodied integrally with the post element 36. Alternatively, the post head 44 could also be embodied separately from the post element 36 and could in particular be mounted on the post element 36. The safety net construction 12 comprises at least one retaining cable 80. The post head 44 comprises a connection element 82 for a mounting of one or several retaining cable/s 80, in particular via a shackle. The safety net construction 12 comprises at least one side guying cable 84. The side guying cable 84 is assigned to a post 34 which forms an edge support of the safety net construction 12. The post head 44 comprises a connection element 86 for a mounting of one or several side guying cable/s 84, in particular via a shackle. The safety net construction 12 comprises at least one vertical cable 88, in particular an opening-up vertical cable. The vertical cable 88 is assigned to a post 34, which forms an edge support of the safety net construction 12. The post head 44 comprises a connection element 90 for a mounting of one or several vertical cables 88, in particular via a shackle. The connection elements 82, 86, 90 for mounting the retaining cables 80, the side guying cables 84 and/or the vertical cable/s 88 are realized in the post head 44 as continuous recesses, in particular as holes.

The safety net construction 12 comprises an energy absorption device 38. The post 34 comprises at least a portion of the energy absorption device 38. Preferably each post comprises an at least substantially identical portion of the energy absorption device 38. The energy absorption device 38 is configured for an absorption at least of a portion of an impact energy occurring in an impact of the impact body 10 into the safety net construction 12. The energy absorption device 38 comprises a cable guiding unit 14. The cable guiding unit 14 forms at least one cable receiving region 16. In addition, the cable guiding unit 14 may form at least one further cable receiving region 92. The cable receiving region 16, 92 is configured for receiving and/or guiding at least one cable 18. In the preferred case shown, the cable guiding unit 14 comprises a cable receiving region 16 that is assigned to the post head 44 and a cable receiving region 92 that is assigned to the post base 48 and is realized separately from the cable receiving region 16. The cable receiving region 16 of the post head 44 is configured for receiving and/or guiding at least the upper carrying cable 52. The cable receiving region 92 of the post base 48 is configured for receiving and/or guiding at least the lower carrying cable 68.

The energy absorption device 38 comprises at least one energy absorption element 20. The energy absorption element 20 is arranged in the cable receiving region 16. The energy absorption element 20 delimits the cable receiving region 16. The energy absorption element 20 delimits the cable receiving region 16 on a valley side. The energy absorption element 20 is arranged at the upper end 42 of the post element 36. The energy absorption element 20 is arranged at the post head 44 of the post element 36. The energy absorption element 20 forms a friction surface 22 for the cable 18, in particular at least the upper carrying cable 52, which is guided in the cable receiving region 16. The energy absorption element 20 is configured, when a force generated for example by the impact of the impact body 10 into the safety net construction 12 is exerted onto the cable 18, in particular the upper carrying cable 52, said force inducing a movement of the cable 18, in particular the upper carrying cable 52, across the friction surface 22, to selectively absorb at least a portion of an energy created by the force via a substantial deformation and/or abrasion of the friction surface 22 (see also FIGS. 3a to 3d).

The energy absorption element 20 is exchangeably mountable in the safety net construction 12. The post 34 comprises a fastening element 54. The fastening element 54 is in the present case embodied integrally with the post element 36.

The fastening element 54 is configured for releasably fastening the energy absorption element 20 at the post element 36. The fastening element 54 is configured to support the energy absorption element 20 relative to the post element 36. The fastening element 54 is configured to support the energy absorption element 20 in a valley-side direction 94 of the safety net construction 12. The energy absorption element 20 is mountable exchangeably at the fastening element 54 via screws and nuts. However, alternative fastening methods known to someone skilled in the art are of course also conceivable. The energy absorption element 20 is curved away from the cable receiving region 16 in peripheral regions 24, 26. A surface 28, in particular the friction surface 22, of the energy absorption element 20 is curved away from the cable receiving region 16. A side of the fastening element 54 which faces toward the cable receiving region 16 at least substantially copies a surface shape of the energy absorption element 20. The energy absorption element 20 is in a mounted state closely adjacent to a surface of the fastening element 54.

The energy absorption device 38 comprises a second energy absorption element 30. The second energy absorption element 30 is embodied separately from the energy absorption element 20. Alternatively, the energy absorption element 20 and the second energy absorption element 30 could be implemented at least partially integrally with each other, for example as a cast part (as cast parts). The second energy absorption element 30 is arranged in the cable receiving region 16. The second energy absorption element 30 delimits the cable receiving region 16. The second energy absorption element 30 delimits the cable receiving region 16 on a rock side. The second energy absorption element 30 is arranged at the upper end 42 of the post element 36. The second energy absorption element 30 is arranged at the post head 44 of the post element 36. The second energy absorption element 30 comprises a further friction surface 32. The second energy absorption element 30 forms the further friction surface 32 for the cable 18, in particular at least the upper carrying cable 52, which is guided in the cable receiving region 16. The further friction surface 32 of the second energy absorption element 30 is oriented at least substantially perpendicularly to the friction surface 22 of the energy absorption element 20. The second energy absorption element 30 is configured, when a force generated, for example, by the impact of the impact body 10 in the safety net construction 12, is exerted onto the cable 18, in particular the upper carrying cable 52, said force inducing a movement of the cable 18, in particular of the upper carrying cable 52, across the further friction surface 32, to selectively absorb at least a portion of an energy created by the force via a substantial deformation and/or abrasion of the further friction surface 32.

The further energy absorption element 30 is exchangeably mountable in the safety net construction 12. The further energy absorption element 30 is mountable at an upper side 96 of the post head 44. The further energy absorption element 30 is applied onto the upper side 96 of the post head 44. The further energy absorption element 30 covers the upper side 96 of the post head 44 partially. The further energy absorption element 30 covers more than a third, preferably more than half, of the upper side 96 of the post head 44. The further energy absorption element 30 extends over an entire length of the upper side 96 of the post head 44, at least in a region in which the upper carrying cable 52 extends across the post head 44. The upper side 96 of the post head 44 is configured to support the further energy absorption element 30 with respect to the post element 36. The upper side 96 of the post head 44 is configured to support the further energy absorption element 30 in a longitudinal direction 98 of the post element 36. The further energy absorption element 30 is exchangeably mountable at the upper side 96 of the post head 44. The further energy absorption element 30 is in a mounted state closely adjacent to a surface of the post head 44.

The further energy absorption element 30 has recesses which overlap with the connection elements 82, 86 of the post head 44 for the vertical cable 88 and the side guying cable 84. In this way an additional fastening of the further energy absorption element 30 at the post head 44 can be ensured. The further energy absorption element 30 is curved away from the cable receiving region 16 in peripheral regions 104, 106. The friction surface 32 of the further energy absorption element 30 is curved away from the cable receiving region 16. The curvature of the friction surface 32 of the further energy absorption element 30 is substantially smaller than the curvature of the friction surface 22 of the energy absorption element 20. In the peripheral regions 24, 26 of the energy absorption element 20, the curvature of the friction surface 22 is approximately 90°. In the peripheral regions 104, 106 of the further energy absorption element 30, the curvature of the friction surface 32 is approximately 35°.

The second energy absorption element 30 has a recess 56 in which the energy absorption element 20 is at least partially inserted in the mounted state. The recess 56 has at least substantially the shape of a cross section of the energy absorption element 20. The recess 56 has at least substantially the shape of a cross section of the combination of the fastening element 54 and the energy absorption element 20 that is mounted at the fastening element 54. The recess at least has substantially a U-shape.

The post element 36, in particular the post head 44, comprises a further fastening element 102. The further fastening element 102 is realized at least substantially complementarily to the fastening element 54 and/or mirrored to the fastening element 54 along a mirror plane bisecting the post head 44. The further fastening element 102 delimits the cable receiving region 16 toward a side that is situated opposite the friction surface 22 of the energy absorption element 20. The further fastening element 102 delimits the cable receiving region 16 in a mountain-side direction 108. The cable guiding unit 14 further comprises a delimiting element 100. The delimiting element 100 delimits the cable receiving region 16 in a direction opposite the second energy absorption element 30. The delimiting element 100 delimits the cable receiving region 16 in a sky-side direction 110. The delimiting element 100 is embodied as a bolt connecting the fastening element 54 and the further fastening element 102. By the two fastening elements 54, 102 the post element 36 is mountable at the post base 48 in two different orientations. This advantageously facilitates mounting and prevents faulty mounting. The delimiting element 100 is configured to prevent the cable 18 from jumping out of the cable receiving region 16. The fastening elements 54, 102 and/or the delimiting element 100 are/is made of a material having a substantially higher Mohs hardness than the energy absorption elements 20, 30.

The energy absorption device 38 comprises a further energy absorption element 40. The further energy absorption element 40 is implemented at least substantially identically to the energy absorption element 20, in particular at least in regard to its functionality. The further energy absorption element 40 is arranged on the post base 48. The further energy absorption element 40 delimits the further cable receiving region 92 of the cable guiding unit 14 of the energy absorption device 38, which is arranged at the post base 48. Except for its size dimensions, the further cable receiving region 92 is implemented at least substantially identically to the cable receiving region 16; therefore in particular another detailed description will be dispensed with in the following. Moreover, in the illustrated case the further cable receiving region 92 is implemented free of a second energy absorption element delimiting the further cable receiving region 92 to a further side. Furthermore, the further cable receiving region 92 is configured for receiving and/or guiding the lower carrying cable 68. For a delimitation of the further cable receiving region 92, the post base 48 comprises two fastening elements 114, 116 and a bolt-like delimiting element 118, which have characteristics that are in particular at least substantially identical to the characteristics of the fastening elements 54, 102 and of the delimiting element 100 of the cable receiving region 16 of the post head 44.

The further energy absorption element 40 comprises a friction surface 50, which in particular has at least substantially the same tasks as the friction surfaces 22, 32 of the energy absorption elements 20, 30 of the post head 44. In the mounted state, the lower carrying cable 68 lies upon the friction surface 50 of the further energy absorption element 40. The friction surface 50 of the further energy absorption element 40 that is arranged on the post base 48 is substantially larger than the respective friction surfaces 22, 32 of the energy absorption elements 20, 30 arranged on the post head 44. "Substantially larger" is in particular to mean larger by at least 5%, preferably larger by at least 10%, preferentially larger by at least 15% and particularly preferentially larger by at least 20%.

The energy absorption element 20, the second energy absorption element 30 and/or the further energy absorption element 40 are/is, at least in a region of the respective friction surface 22, 32, 50, made of a material having a Mohs hardness smaller than 4. The energy absorption element 20, the second energy absorption element 30 and/or the further energy absorption element 40 are/is made of a material that substantially differs from the material of the cable 18, in particular the upper carrying cable 52 and/or the lower carrying cable 68. The energy absorption element 20, the second energy absorption element 30 and/or the further energy absorption element 40 are/is, at least in a region of the respective friction surface 22, 32, 50, made of aluminum or of an aluminum alloy. The energy absorption element 20, the second energy absorption element 30 and/or the further energy absorption element 40 are/is, at least in a region of the respective friction surface 22, 32, 50, made of a material which is under friction with steel, in particular with a steel cable, free of sparking, in particular of friction sparking and/or impact sparking. The energy absorption element 20, the second energy absorption element 30 and/or the further energy absorption element 40 are/is implemented free of movable components. The energy absorption device 38, in particular the energy absorption element 20, the second energy absorption element 30 and/or the further energy absorption element 40, is implemented free of movable components. The energy absorption device 38, in particular the energy absorption element 20, the second energy absorption element 30 and/or the further energy absorption element 40, is implemented free of rollers.

The safety net construction 12 comprises a plurality of energy absorption elements 20, a plurality of second energy absorption elements 30 and a plurality of further energy absorption elements 40. The safety net construction 12 comprises per each post 34 at least one energy absorption element 20, at least one second energy absorption element 30 and at least one further energy absorption element 40. In an impact of the impact body 10 with a maximum impact energy provided for the safety net construction 12, the energy absorption device 38, in particular the energy absorption elements 20, 30, 40 of the energy absorption device 38 in combination, absorbs/absorb at least 10%, preferably at least 15% and preferentially at least 20% of the impact energy. For example, in an impact with an impact energy of 3,000 kJ, the energy absorption device 38 of a safety net construction 12 with the energy absorption device 38, provided for a maximum impact energy of 3,000 kJ, absorbs at least 300 kJ, preferably at least 450 kJ and preferentially at least 600 kJ just via the deformation and/or abrasion of the energy absorption elements 20, 30, 40 brought about by the carrying cables 52, 68.

FIGS. 3a and 3b show the energy absorption element in a non-deformed state, i. e. in particular before a load case has occurred. In the region of the cross section shown in FIG. 3b, the energy absorption element 20 has a thickness 124. In the illustrated case the thickness 124 is 10 mm. FIGS. 3c and 3d show the same energy absorption element 20 in a substantially deformed and/or abraded state, i. e. in particular after the load case occurred. When sweeping over the friction surface 22, the cable 18 generates a notch 120 in the energy absorption element 20. The notch 120 has a depth 122. The depth 122 of the notch 120 is greater than 20% of the thickness 124 of the energy absorption element 20. The depth 122 of the notch 120 is greater than 50% of the thickness 124 of the energy absorption element 20.

FIG. 4 shows a schematic illustration of a cable brake 58 with the energy absorption device 38. The safety net construction 12 comprises the cable brake 58 with the energy absorption device 38. The cable brake 58 is embodied as a block-and-tackle cable brake. The cable brake 58 is embodied as a roller-free block-and-tackle cable brake. The cable brake 58 comprises a cable 18. The cable 18 is embodied as a steel wire cable. The cable brake 58 comprises a first deflection element 62. The cable brake 58 comprises a second deflection element 126. The cable 18 is guided once around the first deflection element 62. The cable 18 is guided twice around the second deflection element 126. The two guidings of the cable 18 around the second deflection element 126 extend in side-by-side situated guiding regions (not shown) of the second deflection element 126. One end 128 of the cable 18 is fastened at a rear side of the first deflection element 62. A second end 134 of the cable 18 is free or is fastened to a cable 18 of the safety net construction 12, for example to a carrying cable 52, 68, to a retaining cable 80, to a side guying cable 84, to a vertical cable 88, to a catch cable or to a further cable of the safety net construction 12, or it implements a cable 18 of the safety net construction 12, in particular at least one of the aforementioned cables 18 of the safety net construction 12. The second deflection element 126 is immovably fixed at the post 34 or at the rock face 66. On the sides of the deflection elements 62, 126 facing toward the cable 18, in each case energy absorption elements 20 of the energy absorption device 38 are arranged. In a load case, i. e. if there is traction at the cable 18 from the direction of the second end 134, the cable 18 is pulled across the friction surfaces 22 of the energy absorption elements 20, wherein at least a substantial portion of the energy created by the traction force is selectively absorbed via a substantial deformation and/or abrasion of the friction surfaces 22 of the energy absorption elements 20 which are arranged at the deflection elements 62, 126.

FIG. 5 shows a flow chart of a method for an at least partial absorption of an impact energy, caused by an impact of an impact body 10 into a safety net construction 12, by means of the energy absorption device 38. In a mounting of the safety net construction 12, in at least one method step 130, at least one cable 18 of the safety net construction 12, for example the carrying cables 52, 68 and/or other cables like retaining cables 80 or catch cables etc. is/are threaded into the cable receiving regions 16, 92 which are provided with the energy absorption elements 20, 30, 40. In at least one method step 132, by an impact of an impact body 10 a force is exerted onto the cables 18 of the safety net construction 12, in particular onto the carrying cables 52, 68 and/or onto other cables like retaining cables 80 or catch cables. As a result of the force of the impact, the cables 18 of the safety net construction 12, in particular the carrying cables 52, 68 and/or other cables like retaining cables 80 or catch cables etc., are pulled across the friction surfaces 22, 32, 50 of the energy absorption elements 20, 30, 40. Herein the material of the energy absorption elements 20, 30, 40, which is softer than the hard cable material, is substantially deformed and/or abraded by the hard cable material. As a result, kinetic energy of the impact body 10, in particular of the cables 18, is converted into deformation energy for the deformation and/or abrasion of the energy absorption elements 20, 30, 40 and is thus absorbed by the energy absorption elements 20, 30, 40. In the method step 132, at least a portion of the impact energy is absorbed as the energy absorption elements 20, 30, 40 of the energy absorption device 38 are selectively deformed and/or selectively abraded, in particular selectively milled, by the cables 18 of the safety net construction 12. In at least one further method step 112, for a restoration of the full protective function of the safety net construction 12, the deformed and/or abraded energy absorption elements 20, 30, 40 are replaced by new non-deformed energy absorption elements 20, 30, 40.

The invention claimed is:

1. An energy absorption device for absorbing at least part of a portion of an impact energy occurring during an impact of an impact body into a safety net construction, comprising:
    at least one cable guiding unit, which forms at least one cable receiving region for receiving and/or guiding at least one steel cable of the safety net construction, and
    at least one energy absorption element, which is arranged in the at least one cable receiving region and which forms at least one friction surface for the at least one received and/or guided steel cable,
    wherein the at least one energy absorption element is configured to selectively absorb via a substantial deformation of the at least one friction surface and/or via a substantial abrasion of the at least one friction surface, at least a portion of the part of the impact energy, which is exerted on the at least one received and/or guided steel cable due to the impact of the impact body into the safety net construction, causing a movement of the at least one received and/or guided steel cable over the at least one friction surface,
    wherein the at least one energy absorption element is realized, at least in a region which comprises the at least one friction surface, of a material (1) having a Mohs hardness that is smaller than 4 and (2) being (a) a semi-metallic or ceramic friction agent having a metal content and a content of graphite and/or ceramic and/or filling material or (b) a metal different from steel.

2. The energy absorption device according to claim 1, wherein the at least one energy absorption element is realized, at least in a region of the at least one friction surface, of a material which is under friction with the at least one steel cable, free of frictional and/or impact sparking.

3. The energy absorption device according to claim 1, wherein at least in a region of the at least one friction surface, the at least one energy absorption element is realized of aluminum or of an aluminum alloy.

4. The energy absorption device according to claim 1, wherein at least the at least one energy absorption element has in at least one peripheral region a surface which is curved away from the at least one cable receiving region.

5. The energy absorption device according to claim 1, further comprising at least one second energy absorption element, which is embodied separately from the at least one energy absorption element.

6. The energy absorption device according to claim 5, wherein the at least one second energy absorption element comprises a friction surface which is oriented at least substantially perpendicularly to the at least one friction surface of the at least one energy absorption element.

7. The energy absorption device according to claim 1, further comprising at least a plurality of energy absorption elements and/or a plurality of second energy absorption elements which, upon the impact of the impact body with a maximum impact energy provided for the safety net construction, in combination absorb at least 10% of the impact energy.

8. The energy absorption device according to claim 1, wherein at least one of the at least one energy absorption element is implemented free of movable components.

9. A post for a safety net construction, comprising:
at least one post element, and
at least one energy absorption device according to claim 1.

10. The post according to claim 9, wherein the at least one energy absorption element is arranged at an upper end of the at least one post element and/or at a post head of the at least one post element.

11. The post according to claim 9, wherein the at least one energy absorption element or a further energy absorption element of the energy absorption device, which is implemented at least substantially identical to the at least one energy absorption element, at least in its functionality, is arranged at a lower end of the at least one post element and/or at a post base of the post and/or of the at least one post element.

12. The post according to claim 9, wherein the at least one energy absorption element is exchangeably mountable.

13. The post according to claim 9, further comprising a fastening element,
which is configured for a releasable fastening of the at least one energy absorption element at the at least one post element and/or for a support of the at least one energy absorption element relative to the at least one post element.

14. The post according to claim 13, wherein the fastening element is realized integrally with the at least one post element.

15. The post according to claim 13, wherein the fastening element is realized of a material having a substantially higher Mohs hardness than the at least one energy absorption element.

16. The post according to claim 9, further comprising at least one second energy absorption element, which is realized separately from the at least one energy absorption element, the at least one second energy absorption element having a recess in which the at least one energy absorption element is at least partially inserted in a mounted state.

17. A cable brake for a safety net construction with at least one cable,
comprising:
at least one deflection element, and
at least one energy absorption device according to claim 1,
wherein the at least one energy absorption element is arranged at the at least one deflection element on a side of the at least one deflection element facing toward the at least one cable.

18. A method for an at least partial absorption of an impact energy,
induced by an impact of an impact body in a safety net construction, comprising:
a step of providing at least one energy absorption device according to claim 1, and
at least one step of absorbing the impact energy, induced by the impact of the impact body in the safety net construction.

19. The method according to claim 18, wherein in the at least one step of absorbing, at least a portion of the impact energy is absorbed by at least one cable of the safety net construction as an energy absorption element of the energy absorption device is selectively deformed and/or at least a portion of the energy absorption element is selectively abraded.

* * * * *